(12) United States Patent
Wallichs et al.

(10) Patent No.: US 9,923,738 B1
(45) Date of Patent: Mar. 20, 2018

(54) BACKCHANNEL TRANSMISSION ADAPTATION

(71) Applicant: Altera Corporation, San Jose, CA (US)

(72) Inventors: Gary Brian Wallichs, San Jose, CA (US); Allen K. Chan, San Jose, CA (US); Kuo-Yin Weng, Los Altos, CA (US)

(73) Assignee: ALTERA CORPORATION, San Jose, CA (US)

( * ) Notice: Subject to any disclaimer, the term of this patent is extended or adjusted under 35 U.S.C. 154(b) by 0 days.

(21) Appl. No.: 15/273,310

(22) Filed: Sep. 22, 2016

(51) Int. Cl.
*H04L 25/03* (2006.01)
*H04B 1/04* (2006.01)

(52) U.S. Cl.
CPC ......... *H04L 25/03057* (2013.01); *H04B 1/04* (2013.01)

(58) Field of Classification Search
CPC ............................ H04L 25/03057; H04B 1/04
See application file for complete search history.

(56) References Cited

U.S. PATENT DOCUMENTS

| | | | | |
|---|---|---|---|---|
| 8,074,126 B1* | 12/2011 | Qian | ....................... | H04L 1/203 375/232 |
| 8,175,143 B1* | 5/2012 | Wong | ................ | H04L 25/03057 375/229 |
| 9,264,276 B1 | 2/2016 | Chan | | |
| 2007/0274379 A1* | 11/2007 | Valliappan | .............. | H04B 3/143 375/232 |
| 2010/0177816 A1* | 7/2010 | Malipatil | .......... | H04L 25/03343 375/233 |
| 2011/0096825 A1* | 4/2011 | Hollis | .............. | H03K 3/356113 375/233 |
| 2012/0076181 A1* | 3/2012 | Aziz | ................. | H04L 25/03057 375/219 |
| 2013/0077669 A1* | 3/2013 | Malipatil | .......... | H04L 25/03019 375/233 |
| 2013/0142245 A1* | 6/2013 | Sindalovsky | ..... | H04L 25/03057 375/233 |
| 2013/0147520 A1* | 6/2013 | Payne | .................... | H03K 5/249 327/51 |
| 2013/0148712 A1* | 6/2013 | Malipatil | ............ | H04L 25/0307 375/233 |
| 2014/0185658 A1* | 7/2014 | Sindalovsky | ......... | H04L 7/0058 375/222 |

* cited by examiner

*Primary Examiner* — Kenneth Lam
(74) *Attorney, Agent, or Firm* — Fletcher Yoder, P.C.

(57) ABSTRACT

Receiver circuitry for receiving a data signal includes summation node circuitry that predicts an error value of the received data signal. The receiver circuitry also includes adaptation engine circuitry coupled to the summation node circuitry. The adaptation engine circuitry determines a transmitter adjustment based on the error value and sends a freeze signal to one or more components of the receiver to cause the receiver to continue operating without changing current settings of the one or more components. The receiver circuitry further includes a user interface and sequence controller, coupled to the adaptation engine circuitry, wherein the user interface and sequence controller sends a signal indicative of the transmitter adjustment to the transmitter.

20 Claims, 8 Drawing Sheets

BACKCHANNEL TRANSMISSION ADAPTATION

RELATED PATENT

This patent application incorporates by reference in its entirety U.S. Pat. No. 9,264,276 entitled "ADAPTATIONS FOR PARTIAL RESPONSE SUMMATION NODE EMBEDDED FPGA TRANSCEIVER" filed on Nov. 14, 2014.

BACKGROUND

This disclosure relates generally to improving signal quality by recovering data from a serial data signal received by circuitry, and more particularly to adapting a transmitter sending the serial data signal based on receiving the serial data signal.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Communicating data between components of a system using high speed serial data signals is of increasing interest and importance to electronic system designers and users. The high speed serial data signals may convey data from one programmable logic integrated circuit (IC) in a system to another programmable logic IC in the system or between components of the same IC. The system may include a single computing device or multiple computing devices connected via wire or wirelessly (e.g., using the Internet).

One problem when using high speed serial data signals is that the signals may be subject to loss of clarity or fidelity when propagating through a medium used to transmit the signals. The loss of fidelity (which may be characterized as signal degradation, attenuation, loss, noise, inter-symbol-interference (ISI), and the like) tends to become more significant as a data rate (e.g., serial bit rate) of the signal increases. The higher the data rate of the serial data signal, the more the signal/transmission degrades. Signal degradation (e.g., as described above from a programmable logic IC transmitting that signal through a transmission medium to another programmable logic IC receiving the signal) increases the difficulty of the receiving IC to correctly interpret the data in the received signal.

To compensate for at least some of the signal degradation that may cause or contribute to receiver data interpretation errors, the receiving IC may be equipped with equalization and/or adaptation circuitry for processing the received high speed serial data signal (e.g., prior to any attempt to recover data information from that signal in more downstream circuitry). In particular, specialized adaptive recovery circuits may compensate for signal degradation due to ISI. For example, Forward Equalization (e.g., R-C/FFE) circuitry and/or Decision Feedback Equalizer (DFE) circuitry may be used at the receiver end. DFE is generally regarded as the most effective at removing post-cursor ISI. A DFE may have multiple "taps," each of which may include a circuit for multiplying a respective earlier (previously received) data bit value (e.g., the $k^{th}$ data bit value prior to a current bit) of an incoming signal by a respective tap coefficient $C_k$ and combining the resulting products with the incoming signal for the current bit. The DFE may determine effective sets of DFE tap coefficient values such that an acceptably low bit error rate is achieved by the receiving IC in recovering data from the received serial data signal.

A DFE may include a summation node that uses the coefficient value to filter the received signal. The summation node may be a partial summation node, which may use a data slicing level (dLev) to "slice" or predict an error value representative of errors in a received serial data signal caused by ISI. (The value dLev may be used to determine whether a symbol in a received signal is a logic one or a logic zero.) In general, dLev is a static setting (e.g., set via configuration bits) in a programmable logic IC. This static setting may limit the quality of the results of signal conditioning adaptive recovery circuitry and may also make performance prone to environmental variations, such as variations in temperature, voltage, or noise. Although dLev adaptation may be used with full response/full rate DFE structures, the timing of these type of DFE structures may not be closed for high speeds such as 28 Gbps for a 20 nanometer process node. Moreover, using half rate DFE structures may require an excessive number of high speed multipliers and sense amplifiers (that may cause excessive loading on the summation node, increase intrinsic kickback noise generated on the summation node, and increase cost and area required for the receiver), as well as high speed multiplexers.

Furthermore, the summation node may employ a defined signal amplitude level for the received signal. The dynamic range of the received signal may be undefined, and may include transmitter output voltage variations, channel loss characteristics that cause amplitude variation, and amplitude uncertainty due to the frequency response of any receiver buffers used to receive the incoming signal.

As used herein, a bit is a binary digit, typically having a value of either 1 or 0. Also as used herein, the singular term "serial data signal" may be used as a generic term for both single-ended and differential serial data signals (even though a differential serial data signal includes two complementary signal constituents).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes systems and methods for improving signal quality by recovering data from a serial data signal received by circuitry, as disclosed in U.S. Pat. No. 9,264,276. For example, the present disclosure includes a data slicing level (dLev) adaptation scheme that may determine an effective predicted dLev for a summation node, such as a partial response summation node, adaptively determining a dLev value, and other systems and methods disclosed in U.S. Pat. No. 9,264,276.

The present disclosure also includes systems and methods for improving signal quality by, among other things, adjusting a transmitter that sends the received signal to improve signal quality by reducing the ISI contributions in the received signal. A transmitter equalization partial response adaptation engine of the receiver may determine a transmitter adjustment based at least in part on error in the received signal, and freeze one or more components of the receiver such that the one or more components continue to operate without changing current settings. The transmitter adjustment may be sent to the transmitter by the receiver via a backchannel (e.g., as provided by components associated with a communication-related standard or protocol such as PCI Express (PCIe), Ethernet, and the like). The transmitter may then adjust its settings to reduce the ISI contributions in the received signals based at least in part on the transmitter adjustment. The transmitter equalization partial response adaptation engine may then send a signal to the one or more components of the receiver to unfreeze, such that the one or more components may resume operating as before freezing.

Accordingly, systems and methods are described that include a communication system for processing a data signal includes a transmitter that sends the data signal to a receiver via a communication channel. The communication system also includes the receiver that receives the data signal via the communication channel. The receiver includes summation node circuitry that predicts an error value of the received data signal. The receiver also includes adaptation engine circuitry coupled to the summation node circuitry. The adaptation engine circuitry determines a transmitter adjustment based at least in part on the error value. The adaptation engine circuitry also sends a freeze signal to one or more components of the receiver to cause the receiver to continue operating without changing current settings of the one or more components so that the effect of the transmitter adjustment can be more accurately determined. The receiver also includes a user interface and sequence controller, coupled to the adaptation engine circuitry. The user interface and sequence controller sends a signal indicative of the transmitter adjustment to the transmitter via a backchannel. The communication system further includes the communication channel and the backchannel.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Techniques for reducing inter-symbol-interference (ISI) in a high speed serial data signal by adjusting a transmitter sending the signal are disclosed. A transmitter equalization partial response adaptation engine of a receiver receiving the signal may determine a transmitter adjustment based at least in part on error in the signal. The transmitter adjustment may be sent to the transmitter by the receiver via a backchannel (e.g., as provided by components associated with a communication-related standard or protocol such as PCI Express (PCIe), Ethernet, and the like). The transmitter may then adjust its settings based at least in part on the transmitter adjustment to reduce the ISI in the received signal.

Figure 1:
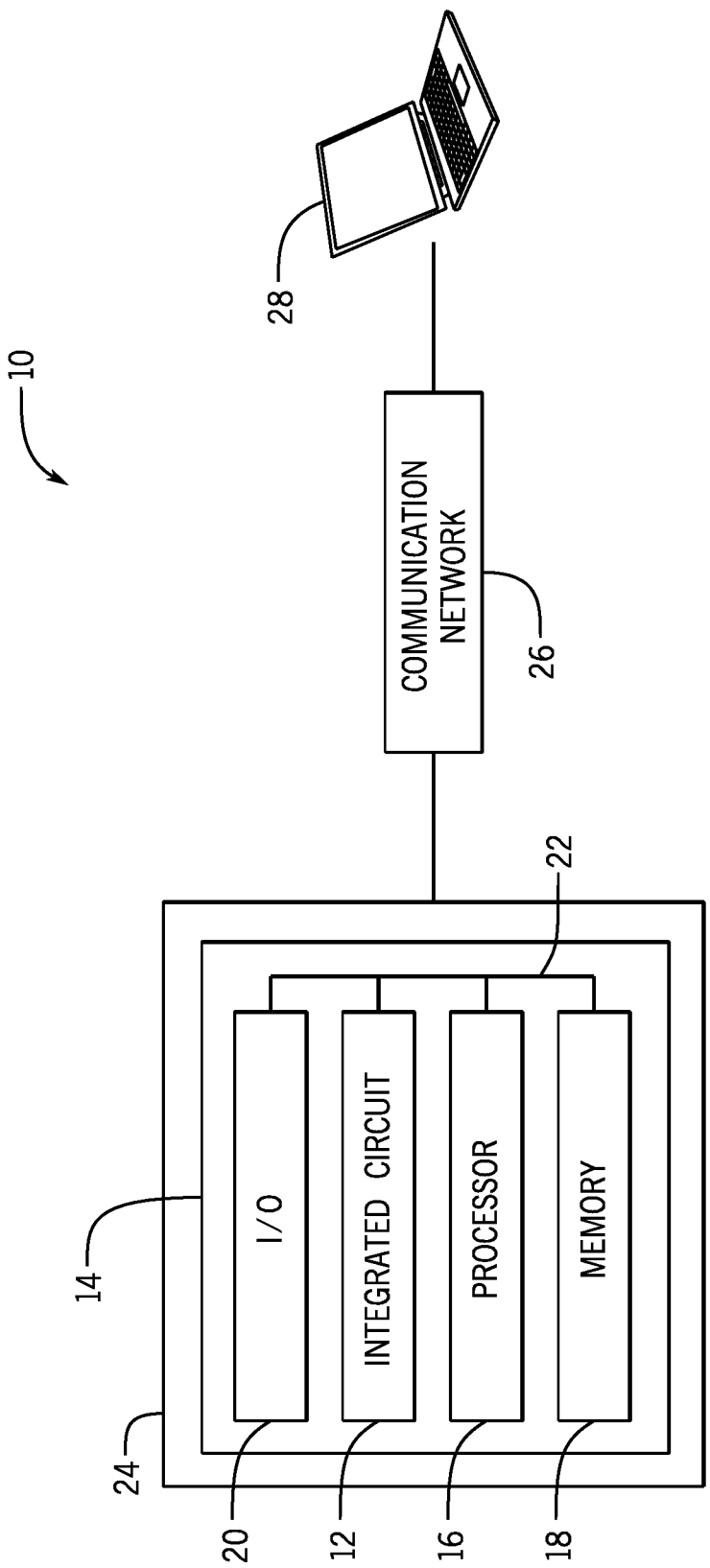
FIG. 1 is a block diagram of a data center system in accordance with an embodiment of the present disclosure.

FIG. 1 is a block diagram of a data center system 10, in accordance with an embodiment of the present disclosure. A circuit or other device 12 that includes embodiments of circuitry as described herein may be a component of a data processing system 14. In some embodiments, the circuit or device 12 may be an integrated circuit, application specific standard product (ASSP), application specific integrated circuit (ASIC), programmable logic device (PLD) (including a Field-Programmable Gate Array (FPGA), full-custom chip, or a dedicated chip), and the like, or a combination thereof. In some embodiments, the integrated circuit 12 may include adaptation circuitry, interfaces, controllers, and/or other circuitry as described herein. The data processing system 14 may also include one or more of the following components: processor 16, memory 18, I/O circuitry 20, and the like. These components may be communicatively coupled together by a system bus or other interconnection 22.

As illustrated, the data processing system 14 is used in a data center 24. The data processing system 14 may be used in telecommunications, data storage, and other suitable applications. The data center 24 may communicatively couple to a communication network 26 (e.g., the Internet) via, for example, the I/O circuitry 20. Users may access the data center 24 by communicatively coupled to the communication network 26. The greater power, lower latency, and faster data analysis provided by using purpose-built hardware, such as the circuitry 12 as disclosed herein, enable greater performance and efficiency for users of the data center 24.

In some embodiments, the integrated circuit 12 may control power supply, redundant data communication connections, environmental controls, security devices, and the like. Additionally, it should be noted that data center 24 is only exemplary, and the data processing system 14 may be used in alternative applications, such as communications, computer networking, data networking, instrumentation, video processing, digital signal processing, or any other application where the advantage of using programmable or reprogrammable logic is desirable. The circuit 12 may perform a variety of different logic functions. For example, the circuit 12 may be configured as a processor or controller that works in cooperation with the processor 16. The circuit 12 may also be used as an arbiter for arbitrating access to a shared resource in the data center 24. In yet another example, the circuit 12 may be configured as an interface between the processor 16 and one of the other components in the data center 24.

Figure 2:
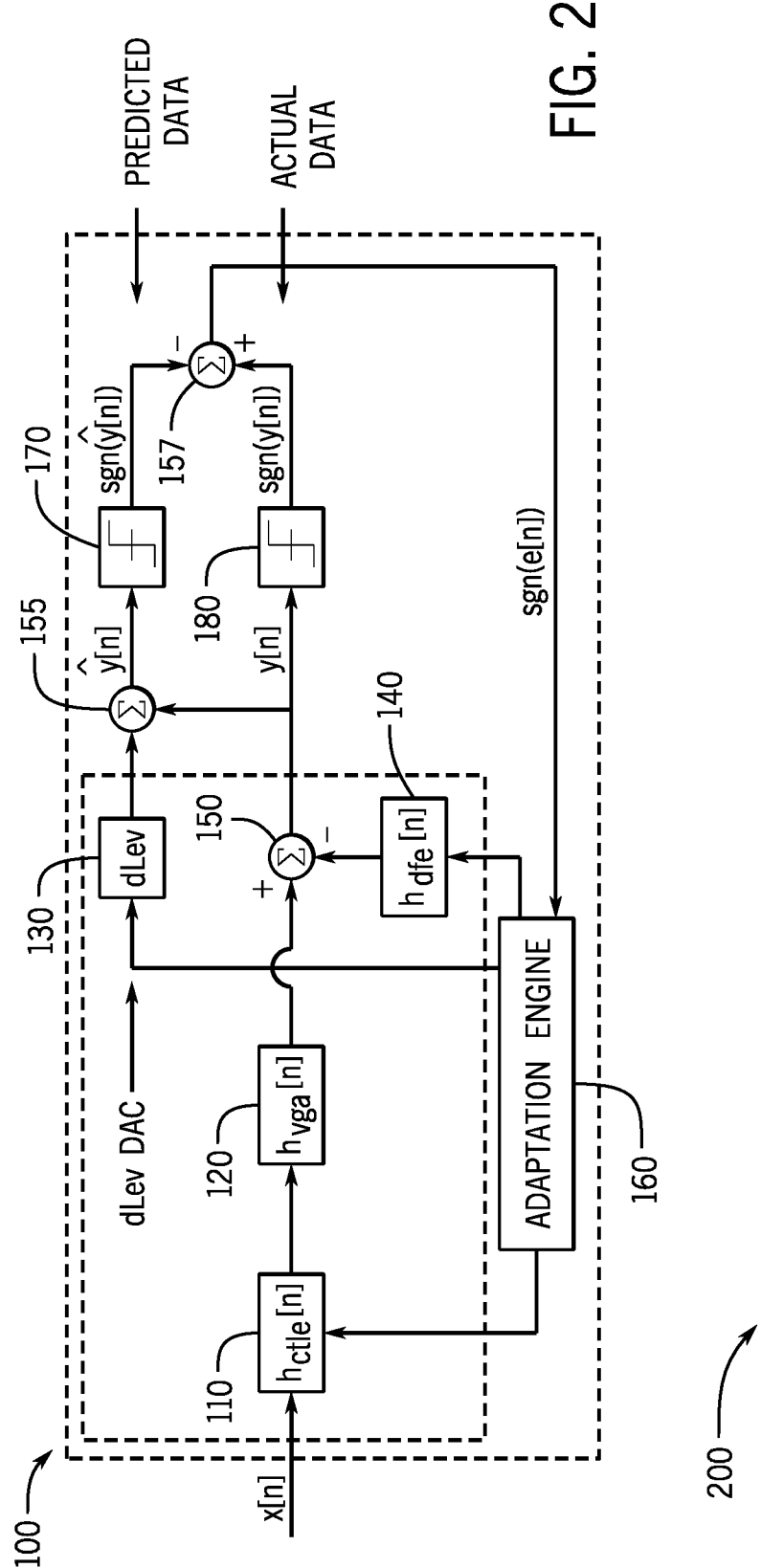
FIG. 2 is a simplified block diagram of circuitry used to implement the Sign-Sign Least-Mean Square (LMS) technique, in accordance with an embodiment of the present disclosure.

The following discussion (as related to FIGS. 2-7) relates to the systems and methods for improving signal quality by recovering data from a serial data signal received by circuitry, as disclosed in U.S. Pat. No. 9,264,276. FIG. 2 is a simplified block diagram of circuitry 100 used to implement the Sign-Sign Least-Mean Square (LMS) technique, in accordance with an embodiment of the present disclosure. Circuitry 100 includes continuous time linear equalizer 110, variable gain amplifier 120, data slicing level (dLev) computation block 130, decision feedback equalizer 140, summers 150, 155, and 157, sign function computation units 170 and 180, and adaptation engine 160.

Figure 3:
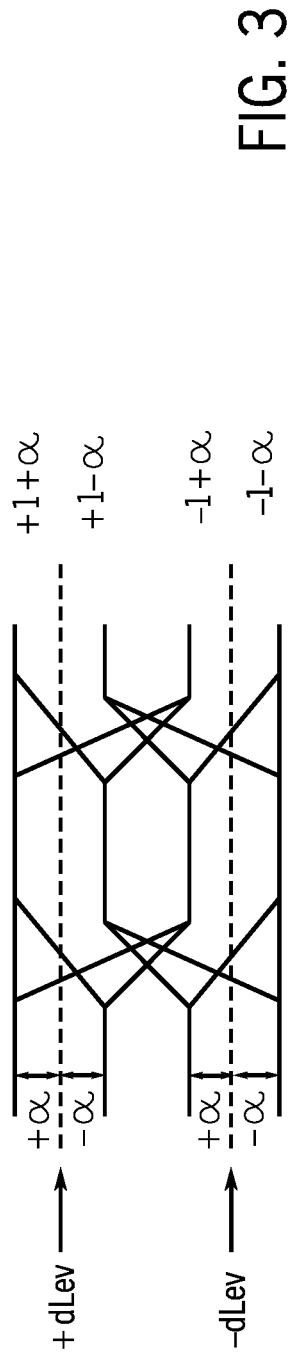
FIG. 3 is an eye diagram of superimposed received signals that shows data slicing level (dLev) as the statistical mean of the voltage levels of those signals that may be used to better understand the present disclosure.

FIG. 3 is an eye diagram 200 of superimposed received signals that shows dLev as the statistical mean of the voltage levels of those signals. The eye diagram 200 of the received signal results from superimposing multiple data bits from the received signal on a single unit interval of the received signal. The unit interval is a time duration of any one bit in the received signal. The horizontal axis of the eye diagram 200 is time, and the vertical axis is signal voltage. As illustrated, the eye diagram 200 (i.e., closed-loop signal traces) of the received signal is asymmetrical in a vertical direction, due to issues such as inter-symbol-interference (ISI). In particular, the super-positioned received signals have voltage level variations due to ISI energy. +dLev and −dLev represent statistical means of voltage levels of the received signal, such as a logic one (indicated by, e.g., +1) or a logic zero (indicated by, e.g., −1). The value +α and −α represent, respectively, positive-valued and negative-valued deviation of the voltage levels from the values of +dLev and −dLev. Thus, dLev, is the most effective data slicing level to determine whether a symbol in the received signal is a logic one or a logic zero.

Figure 4:
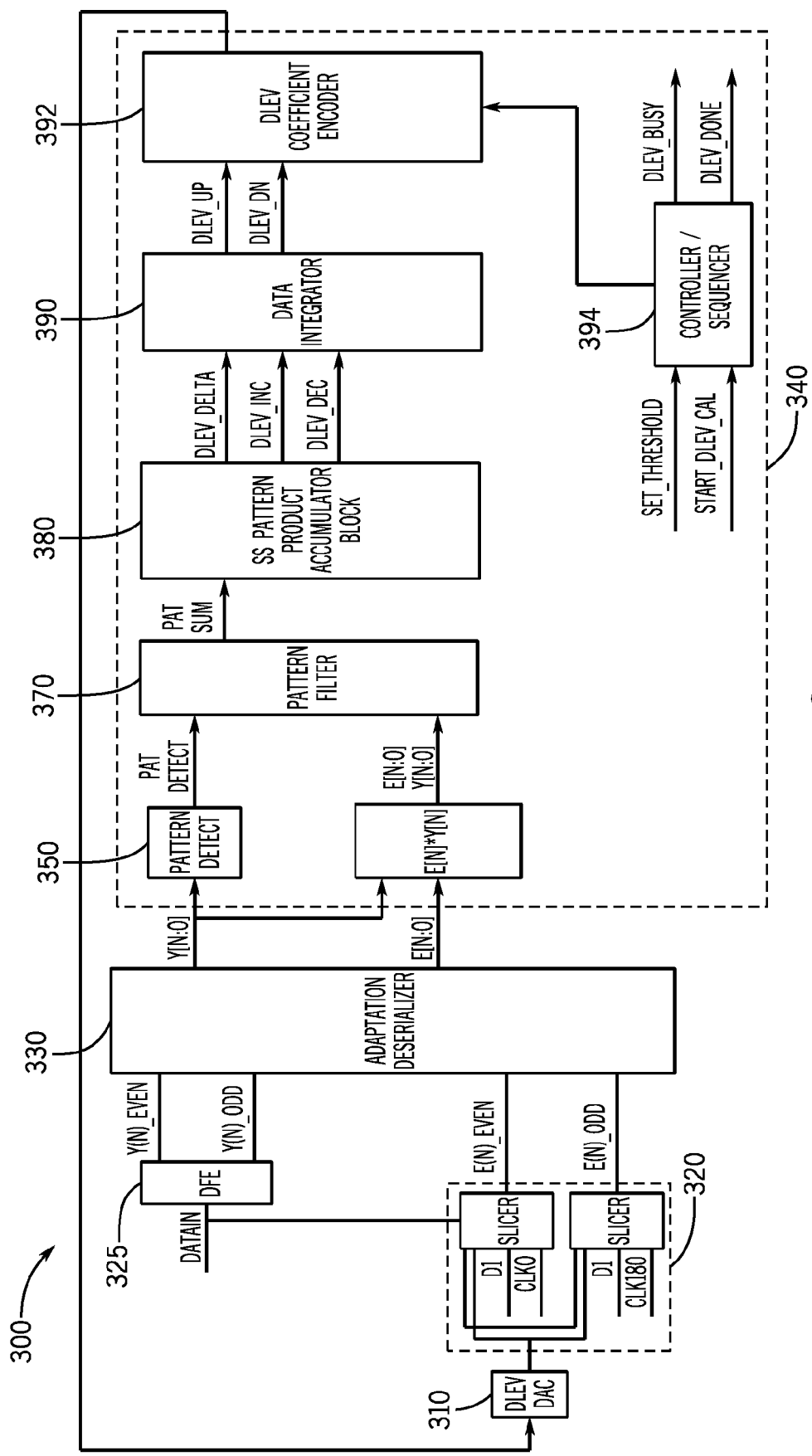
FIG. 4 is a first type of adaptation circuitry used at a receiver to process a received high speed serial data signal, in accordance with an embodiment of the present disclosure.

FIG. 4 is a first type of adaptation circuitry 300 used at a receiver to process a received high speed serial data signal, in accordance with some embodiments. Adaptation circuitry 300 includes dLev Digital-to-Analog Convertor (DAC) 310, partial response summation node 320, adaptation/data deserializer 330, partial response dLev Sign-Sign LMS adaptation engine 340, and other circuitry such as Decision Feedback Equalizer (DFE) circuitry 325. The partial response dLev Sign-Sign LMS adaptation engine 340 may include pattern detector 350, sign product generator 360, pattern filter 370, data accumulator 380, data integrator 390, dLev coefficient generator/encoder 392, and controller/sequencer 394. The adaptation circuitry 300 may enable the dLev value to converge to a certain predicted value at a rapid rate. The DAC 310 may convert encoded digital data into an analog voltage. An output of the DAC 310 may span a dynamic range (e.g., of amplitude and frequency) of the received signal at summation node 320. The operation of the DAC 310 may be controlled by the partial response dLev Sign-Sign LMS adaptation engine 340, e.g., via dLev coefficient generator/encoder 392. In some embodiments, the partial response summation node 320 may achieve 28 Gbps operation by the receiver.

The partial response summation node 320 may be used instead of a full response node, because a full response DFE may not be able to close its feedback while operating at speeds such as 28 Gbps for a first tap coefficient (i.e., the tap coefficient may instead be speculated). Moreover, a full response summation node, as opposed to a partial response summation node, may use an excessive number (e.g., eight) of sense amplifiers, which may cause excessive loading on the summation node, and may cause excessive bandwidth limitations.

The partial response summation node 320 may use two sense amplifiers to "slice" or predict an error value representative of errors in a received serial data signal caused by ISI. Using fewer sense amplifiers may trade physical limitations of the summation node 320 for an extended use of digital signal processing in the partial response dLev Sign-Sign LMS adaptation engine 340. In particular, the partial response summation node 320 may use existing DFE data from a DFE data path (i.e., data from a signal processing engine in the partial response dLev Sign-Sign LMS adaptation engine 340) to select a correct tap coefficient value (e.g., a speculated tap coefficient value that has been pre-calculated) to be used in processing any received signals. More specifically, multiplexing +/−α and +/−dLev may enable a downstream signal processing engine, e.g. in the partial response dLev Sign-Sign LMS adaptation engine 340, to control the partial response summation node 320 and filter data from a received signal to statistically capture data that would be captured by a full response summation node. Moreover, by reducing the number of sense amplifiers used in comparison with a full response summation node, kick back noise and parasitic loading (e.g., parasitic capacitance) may be reduced to achieve a higher operating speed for, such as 28 Gbps, for the receiver. In addition, in comparison with a half rate full response summation node, a partial response summation node may reduce power consumption and increase bandwidth.

The adaptation/data deserializer 330 may convert incoming half-rate data (e.g., $y[n]_{even}$ and $y[n]_{odd}$) into data for a slower frequency parallel bus. The adaptation/data deserializer 330 may also convert incoming half-rate predicted data (e.g., $e[n]_{even}$ and $e[n]_{odd}$) into data for the slower frequency parallel bus. The adaptation/data deserializer 330 may reduce the incoming data rate (of the data in the received signal) to the value of $F_{max}$ for digital adaptation circuitry, such as adaptation circuitry 300.

The partial response dLev Sign-Sign LMS adaptation engine 340 may compute $C_k(n+1)=C_k(n)+\mu \cdot sgn[e(n)] \cdot sgn[y(n)]$ in the Sign-Sign LMS technique where $C_k(n+1)$ is a new coefficient, $C_k(n)$ is a previous coefficient, $\mu$ is a convergence factor, y(n) is a decided data signal (i.e., a digital signal derived from an $n^{th}$ sample), e(n) is an error signal associated with the $n^{th}$ sample, and sgn[x] is a sign function that returns +1 for x>0 and −1 for x<0. DFE 325 may be any adaptive equalizer, such as a DFE that adapts to time-varying properties of a communications channel that equalizes an incoming signal.

The pattern detector 350 may receive the signal y(n) from the adaptation/data deserializer 330 and may detect if incoming data is valid based at least in part on the multiplexed signals +/−α and +/−dLev from the partial response summation node 320. If (−dLev) and (−α) are received, then the pattern detector 350 may determine that the pattern is valid if the received data is −dLev−α. If (−dLev) and (+α) are received, then the pattern detector 350 may determine that the pattern is valid if the received data is −dLev+α. If (+dLev) and (−α) are received, then the pattern detector 350 may determine that the pattern is valid if the received data is +dLev−α. If (+dLev) and (+α) are received, then the pattern detector 350 may determine that the pattern is valid if the received data is +dLev+α. The pattern detector 350 may output a signal (e.g., signal pat_det) to the pattern filter 370 that indicates whether the incoming data is valid based on the determination by the pattern detector 350 of whether the pattern is valid.

The sign product generator 360 may receive the e(n) and y(n) signals from the adaptation/data deserializer 330 and compute the bitwise product sgn[e(n)]·sgn[y(n)] for use in the Sign-Sign LMS technique computation.

The pattern filter 370 may receive the bitwise product sgn[e(n)]·sgn[y(n)] from the sign product generator 360 and the output from the pattern detector 350. The pattern filter 370 may output (e.g., as signal pat_sum) a filtered version of the input from the sign product generator 360, and may pass the bitwise product sgn[e(n)]·sgn[y(n)], for example, only when the output of the pattern detector 350 indicates that the incoming data is valid based on the determination by the pattern detector 350 of whether the pattern is valid.

The data accumulator 380 may receive the output of the pattern filter 370 and may accumulate the summation of bitwise sign products in parallel per parallel clock cycles. The data accumulator 380 may output the accumulated value as a signal (e.g., signal dLev_delta). In every clock cycle, the data accumulator 380 may also determine whether the result of the accumulated bitwise sign products is positive or negative. If the result is positive, the data accumulator 380 may assert a first signal (e.g., dLev_inc). If the result is negative, the data accumulator 380 may assert a second signal (e.g., dLev_dec). The outputs of data accumulator 380 may be input to the data integrator 390.

The data integrator 390 may operate as an averaging filter. That is, the data integrator 390 may average the filtered product of sign errors produced by the data accumulator 380. The data integrator 390 may output signals (e.g., dLev_up and dLev_dn) to control incrementing or decrementing the dLev coefficient generator/encoder 392. In particular, the data integrator 390 may assert, increment, or decrement one or more output signals (e.g., dLev_up or dLev_dn) when the average of the filtered product (integration value) of sign errors produced by the data accumulator 380 reach predefined thresholds. These signals may control the operation of the dLev coefficient generator/encoder 392.

The dLev coefficient generator/encoder 392 may generate the dLev DAC 310 coefficients based on the output signals (dLev_up and dLev_down) received from the data integrator 390. The dLev DAC 310 coefficients produced by the dLev coefficient generator/encoder 392 may be encoded using any suitable encoding scheme to reduce or avoid possible switching noise.

The controller/sequencer 394 may control averaging of the multiplexing of +/−α at the partial response summation node 320. The controller/sequencer 394 may also control averaging the multiplexing of +/−dLev at the partial response summation node 320. The controller/sequencer 394 may control selection of a valid pattern within the pattern detector 350. The controller/sequencer 394 may also sequence initializing (e.g., via an output signal dLev_BUSY) and resetting (e.g., via an output signal dLev_DONE) blocks and/or circuitry within the partial response dLev Sign-Sign LMS adaptation engine 340. Any thresholds referred to herein may be set at the controller/sequencer 394 using an input signal (e.g., SET_THRESHOLD). The controller/sequencer 394 may calibrate the partial response dLev Sign-Sign LMS adaptation engine 340 by asserting a calibration input signal (e.g., START_dLev_CAL) on the controller/sequencer 394.

Figure 5:
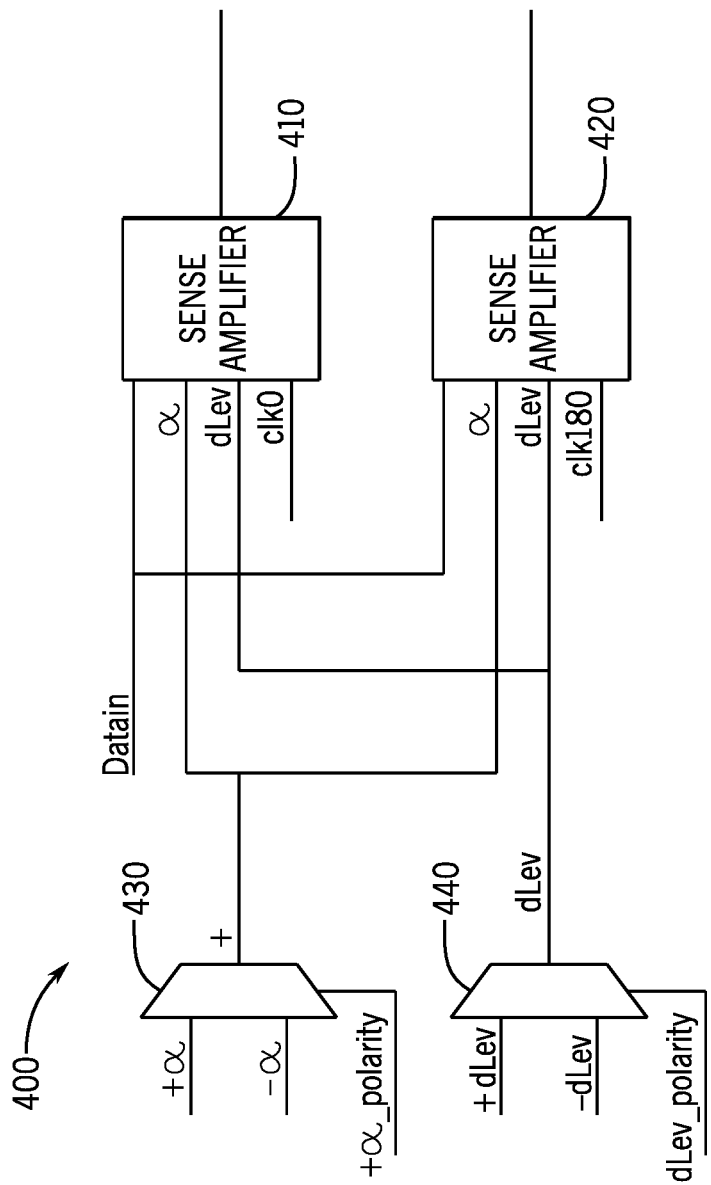
FIG. 5 is a partial response summation node, similar in form and function to the partial response summation node of FIG. 3, in accordance with an embodiment of the present disclosure.

FIG. 5 is a partial response summation node 400, similar in form and function to the partial response summation node 320 of FIG. 4, in accordance with an embodiment of the present disclosure. The partial response summation node 400 may use sense amplifiers 410, 420 to "slice" or predict an error value representative of errors in a received serial data signal caused by ISI. Using the two sense amplifiers 410, 420 may trade physical limitations of the summation node 400 for an extended use of digital signal processing in a partial response dLev Sign-Sign LMS adaptation engine. The partial response summation node 400 may use values +α and −α, values +dLev and −dLev, and polarities of a and dLev, as inputs to multiplexers 430, 440. The multiplexers 430, 440 may each be replaced by any suitable equivalent selection circuitry.

The partial response summation node 400 may use existing DFE data from a DFE data path (e.g., data from a signal processing engine in the partial response dLev Sign-Sign LMS adaptation engine 340) to select (using the multiplexers 430 and 440) a correct tap coefficient value (e.g., a speculated tap coefficient value that has been pre-calculated) used in processing any received signals. More specifically, multiplexing +/−α and +/−dLev may enable a downstream signal processing engine, e.g. in the partial response dLev Sign-Sign LMS adaptation engine 340, to control the partial response summation node 400 and filter data from a received signal to statistically capture data that would be captured by a full response summation node. Moreover, by reducing the number of sense amplifiers used in the partial response summation node 400 in comparison with a full response summation node, kick back noise and parasitic loading (e.g., parasitic capacitance) may be reduced to achieve a higher operating speed for, such as 28 Gbps, for the receiver. In addition, in comparison with a half rate full response summation node, the partial response summation node 400 may reduce power consumption and increase bandwidth.

Figure 6:
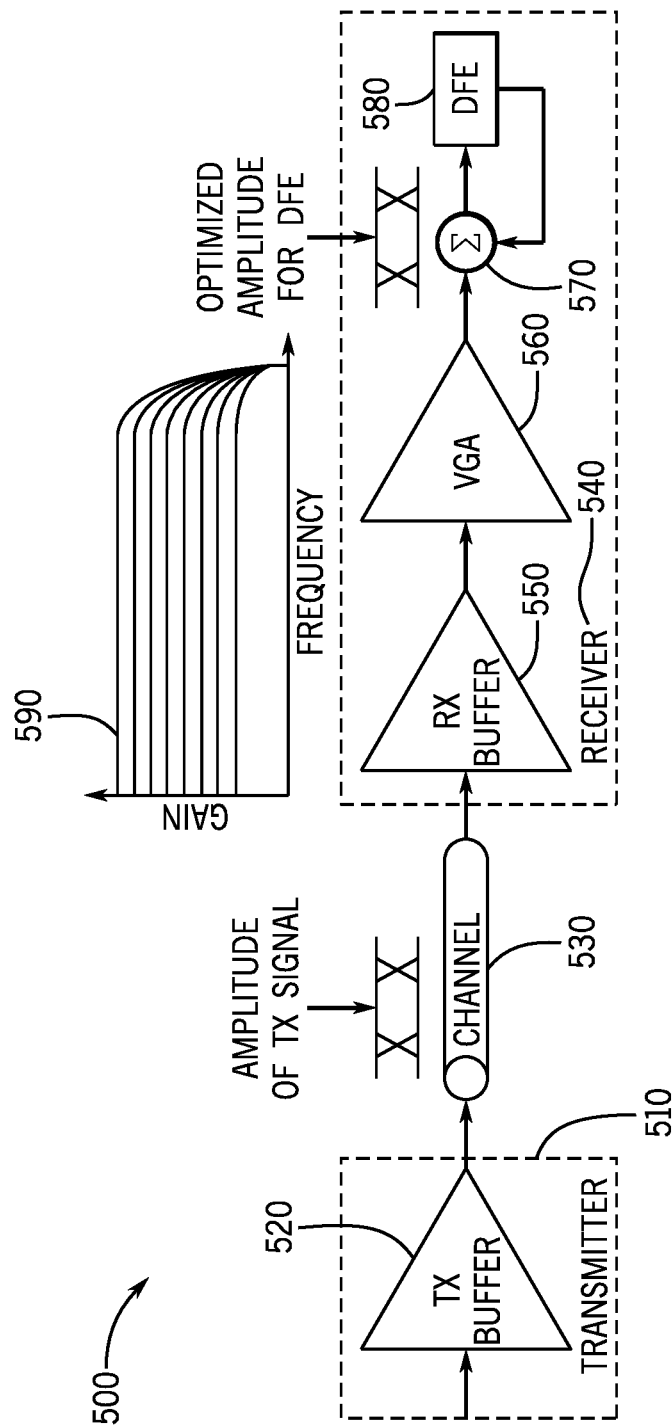
FIG. 6 is a communication system that includes a variable gain amplifier in a receiver prior to summing at a summation node, in accordance with an embodiment of the present disclosure.

FIG. 6 is communication system 500 that includes a Variable Gain Amplifier (VGA) 560 in a receiver 540 prior to summing at summation node 570. The communication system 500 includes transmitter 510, communications channel 530, and the receiver 540. The transmitter 510 includes transmit buffer 520. The receiver 540 includes receive buffer 550, the Variable Gain Amplifier (VGA) 560, the summation node 570, and DFE 580. The transmitter 510 may transmit a data signal through communications channel 530. The transmit buffer 520 may buffer the data signal to be transmitted by transmitter 510. The data signal may propagate through the communications channel 530, which may be any medium used to communicate such signals. The data signal loses clarity or fidelity as it propagates through the communications channel 530. Such loss of fidelity may be characterized as signal degradation, attenuation, loss, noise, ISI, and the like. The receiver 540 may then receive the data signal. Within the receiver 540, the receive buffer 550 may buffer the received data signal and output the data signal to the VGA 560. The VGA 560 may apply a gain to the received data signal by, for example, amplifying the received data signal by a certain magnitude. The magnitude may be determined by adapting the received data signal, using adaptation circuitry, to establish proper amplitude/signaling levels. In particular, the magnitude of amplification at the VGA 560 may be adjusted to properly define an amplitude of the received signal for its use at the summation node.

Chart 590 is an example transfer function of different configurable/selectable gain levels (e.g., via a control signal), represented by a y-axis, that may be applied to the received data signal versus frequencies, represented by an x-axis, across which the gain may be applied. After a gain is applied to the received data signal by the VGA 560, the received data signal may be output to the summation node 570. The summation node 570 may be similar in form and function to the partial response summation node 320 of FIG. 4 or the partial response summation node 400 as described with reference to FIG. 5. The DFE 580 may be similar in form and function to DFE 325 as described with reference to FIG. 4. In some embodiments, the DFE 580 may output the equalized received data signal to summation node 570, as a feedback input.

Using the VGA 560 after the receiver buffer 550 and prior to summing at the summation node 570 (e.g., a partial response summation node) may enable the amplitude of the received signal to be defined for its use at the summation node 570. The VGA 560 may maintain proper signaling levels at the summation node 570, and the output of the VGA 560, which is input to the summation node 570, may thereby be at the proper signaling levels. In addition, the VGA 560 may ensure linear functionality of the DFE 580. The partial response summation node (such as the summation node 570) may enable (e.g., determine and/or set) a bandwidth that, for example, achieves 28 Gbps operation by the receiver. Moreover, as presented herein, using a partial response dLev Sign-Sign LMS adaptation engine and/or a VGA partial response adaptation engine, together with the partial response summation node, may overcome complexities that may be inherent to using the partial response summation node.

Figure 7:
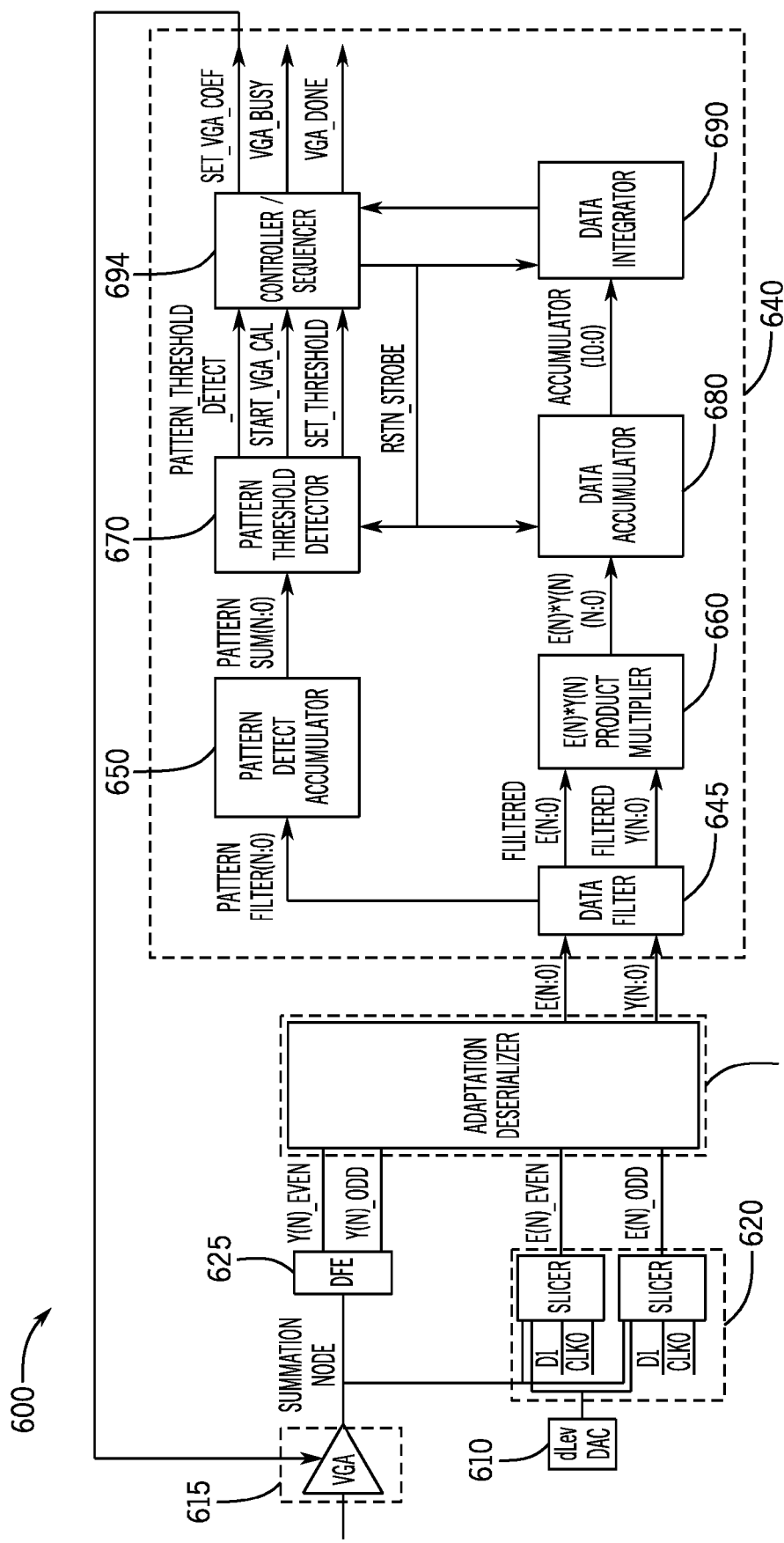
FIG. 7 is a second type of adaptation circuitry used at a receiver to process a received high speed serial data signal, in accordance with an embodiment of the present disclosure, in accordance with an embodiment of the present disclosure.

As mentioned above, the present disclosure is related to improving signal quality, for example, by recovering data from a serial data signal received by circuitry, as disclosed in U.S. Pat. No. 9,264,276. Signal quality may also alternatively or additionally improved by using the following system and methods for adapting a transmitter that sends the serial data signal based on receiving the serial data signal. In particular, the transmitter may be adjusted to improve signal quality by reducing the ISI contributions in the received signal. FIG. 7 is adaptation circuitry 600 used at a receiver to process a received high speed serial data signal, in accordance with an embodiment of the present disclosure.

The adaptation circuitry 600 includes dLev Digital-to-Analog Convertor (DAC) 610, Variable Gain Amplifier (VGA) 615, partial response summation node 620, adaptation/data deserializer 630, VGA partial response adaptation engine 640, and other circuitry such as DFE 625. The VGA partial response adaptation engine 640 may also include data filter 645, pattern detect accumulator 650, sign product generator 660, pattern threshold detector 670, data accumulator 680, data integrator 690, and controller/sequencer 694. The DAC 610 may convert encoded digital data into an analog voltage. The output of the DAC 610 may span the received signal's dynamic range (e.g., in terms of amplitude and frequency) at summation node 620. The operation of the DAC 61 may be controlled by the VGA partial response adaptation engine 640. The partial response summation node 620 may achieve 28 Gbps operation by the receiver.

The VGA 615 may be similar to the VGA 560 as described with reference to FIG. 6. In particular, a received data signal may be input to the VGA 615. The VGA 615 may apply a gain to the received data signal by, for example, amplifying the received data signal by a certain magnitude. The magnitude may be determined by adapting the received data signal, using adaptation circuitry, to establish proper amplitude/signaling levels. In particular, the gain applied by the VGA 615 may be variable and may be changed by a control signal provided to the VGA 615, for example, by a signal output by the controller/sequencer 694 within the adaptation circuitry 600.

The VGA 615 may properly define the amplitude of the received signal for use at a summation node. The VGA 615 may ensure that an outer envelope of the received data signal at the summation node is suitable or optimal for use in the DFE 625. In addition, the VGA 615 may compensate for various received data signal conditions within any system in which the adaptation circuitry 600 is used. After a gain is applied to the received data signal by the VGA 615, the received data signal may be output to the summation node 620. An example transfer function of the VGA 615 is shown as the chart 590 of FIG. 6.

The partial response summation node 620 may be similar in form and in function to the partial response summation node 320 as described with reference to FIG. 4, to the partial response summation node 400 as described with reference to FIG. 5, and/or the summation node 570 as described with reference to FIG. 6.

The DFE 625 may be similar in form and function to the DFE 325 as described with reference to FIG. 4. In some embodiments, the DFE 625 may output the equalized received data signal to the summation node 620, as a feedback input. The adaptation/data deserializer 630 may be similar in form and in function to the adaptation/data deserializer 330 as described with reference to FIG. 4.

The data filter 645 may receive signals y(n) and e(n) from the adaptation/data deserializer 630 and may detect if incoming data is valid based on multiplexed signals $+/-\alpha$ and $+/-$dLev from the partial response summation node 620. If (+dLev) and (+$\alpha$) are received, then the data filter 645 may determine that the pattern is valid if the received data is +dLev+$\alpha$. If (-dLev) and (-$\alpha$) are received, then the data filter 645 may determine that the pattern is valid if the received data is -dLev-$\alpha$. The data filter 645 may output a signal (e.g., Pattern Filter) to the pattern detect accumulator 650 that indicates a number of detected valid patterns for the pattern detect accumulator 650 to process. The data filter 645 may also output parallel signals to the sign product generator 660 that are filtered errors (e.g., Filtered_e) and a latency-matched data signal (e.g., Filtered_y).

The sign product generator 660 may be similar in form and in function to the sign product generator 360 as described with reference to FIG. 4. The sign product generator 660 may output the bitwise product sgn[e(n)]·sgn[y(n)] to the data accumulator 680.

The data accumulator 680 may receive the output of sign product generator 660 and may accumulate (e.g., N=N+the input to the data accumulator 680) the summation of bitwise sign products in parallel per parallel clock cycles. The data accumulator 680 may output the accumulated value as a signal (e.g., signal Accumulator) to the data integrator 690 to filter out high frequency components in the outputted signal.

The data integrator 690 may operate as an averaging filter. In particular, the data integrator 690 may average (e.g., N=(N+the input to data integrator 690)/M) the output signal from the data accumulator 680. In particular, the data integrator 690 may serve as an averaging filter for the accumulated sign product. In addition, the data integrator 690 may average the filtered product of sign errors produced by the data accumulator 680. The data integrator 690 may output (as a signal) its result to the controller/sequencer 694 for further processing.

The pattern detect accumulator 650 may receive the output of the data filter 645 and may accumulate the summation of bitwise patterns detected value of the input received from the data filter 645. The pattern detect accumulator 650 may output this running accumulated value (e.g., via signal Pattern Sum) to the pattern threshold detector 670.

The pattern threshold detector 670 may receive the output of the pattern detect accumulator 650 and may determine when the running total of patterns detected reaches a pre-defined threshold. When the pre-defined threshold is reached, the pattern threshold detector 670 may output an asserted signal (e.g., Pattern_Threshold_Detect) to the controller/sequencer 694.

The controller/sequencer 694 may sequence initialization and controls for circuitry within the VGA partial response adaptation engine 640. In addition, the controller/sequencer 694 may control operation of the VGA 615 (which may control the partial response summation node 620 based on outputs of the controller/sequencer 694). The controller/sequencer 694 may receive the output of pattern threshold detector 670 and the outputs of one or more of the other circuitry within the VGA partial response adaptation engine 640, and may process this input data to control an amplification level of the VGA 615.

Figure 8:
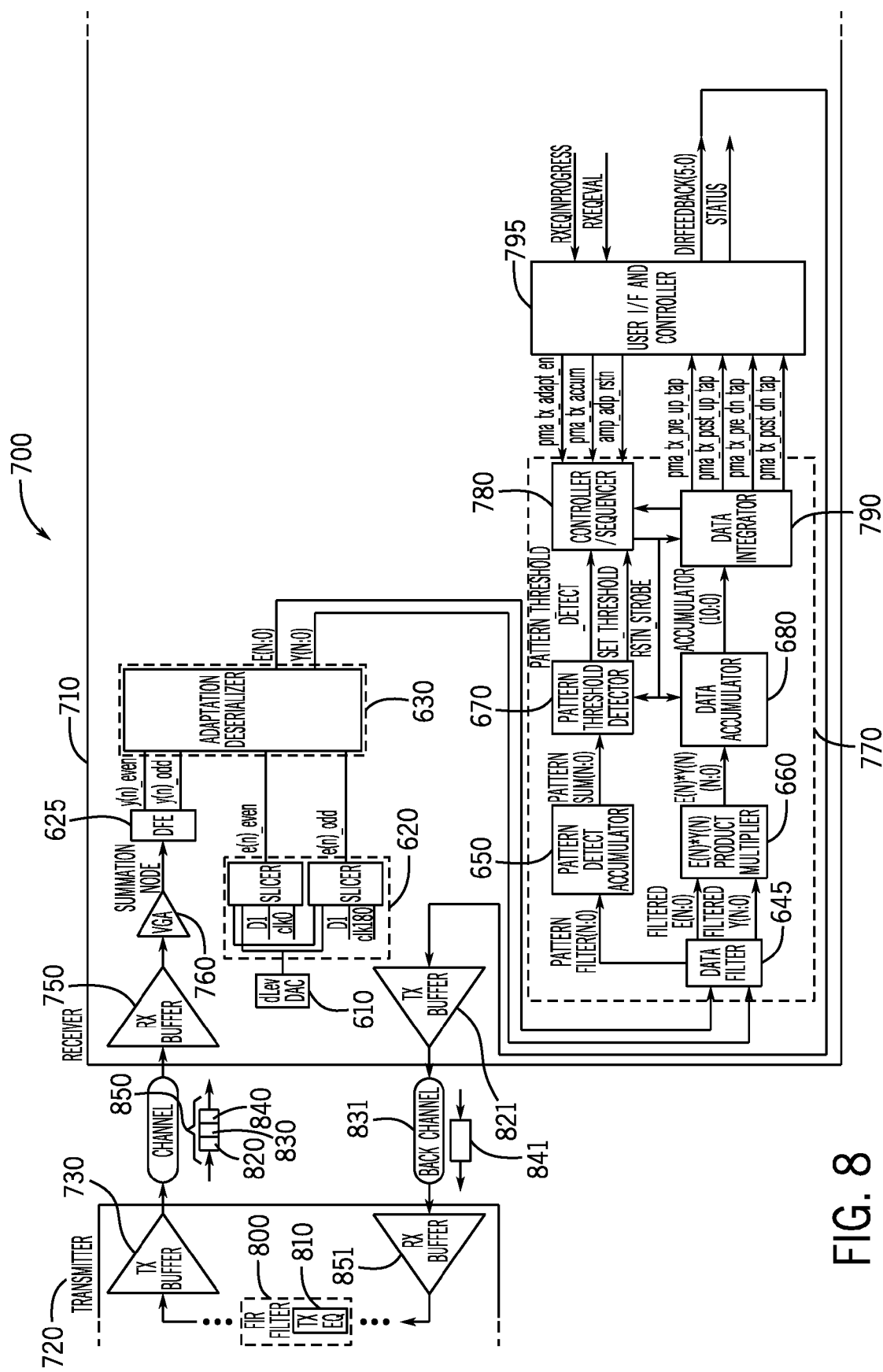
FIG. 8 is a third type of adaptation circuitry used at a receiver to process a received high speed serial data signal, in accordance with an embodiment of the present disclosure.

FIG. 8 is third type of adaptation circuitry used at a receiver 710 to process a received high speed serial data signal, in accordance with an embodiment of the present disclosure. As illustrated, a transmitter 720 sends the high speed serial data signal using a transmit buffer 730, which may buffer the data signal. The transmitter 720 may send the data signal through communications channel 740. The data signal may propagate through the communications channel 740, which may include any suitable medium for communicating such signals. The data signal may lose clarity or fidelity as it propagates through the communications channel 740. Such loss of fidelity may be characterized as signal degradation, attenuation, loss, noise, ISI, and the like.

As illustrated, the receiver 710 receives the data signal via the communications channel 740 at receive buffer 750. The receive buffer 750 may buffer the received data signal and output the data signal to the VGA 760. The VGA 760 may apply a gain to the received data signal by, for example, amplifying the received data signal by a certain magnitude. The magnitude may be determined by adapting the received data signal, using adaptation circuitry, to establish proper amplitude/signaling levels. In particular, the magnitude of amplification at the VGA 760 may be adjusted to properly define an amplitude of the received signal for its use at the summation node.

The receiver 710 also includes the dLev Digital-to-Analog Convertor (DAC) 610, the partial response summation node 620, the adaptation/data deserializer 630, and other circuitry, such as the DFE 625, as described with reference to FIG. 7. The receiver 710 includes a transmitter equalization partial response adaptation engine 770, that may include the data filter 645, the pattern detect accumulator 650, the sign product generator 660, the pattern threshold detector 670, and the data accumulator 680, as described with reference to FIG. 7. The DAC 610 may convert encoded digital data into an analog voltage. The output of the DAC 610 may span the received signal's dynamic range (e.g., in terms of amplitude and frequency) at the summation node 620. The operation of the DAC 610 may be controlled by the transmitter equalization partial response adaptation engine 770. The partial response summation node 620 may achieve 28 Gbps operation by the receiver 710.

The transmitter equalization partial response adaptation engine 770 also includes controller/sequencer 780 and data integrator 790. The controller/sequencer 780 may sequence initialization and controls for circuitry within the transmitter equalization partial response adaptation engine 770. In addition, the controller/sequencer 780 may control operation of the VGA 760 (which may control the partial response summation node 620 based on outputs of the controller/sequencer 780). The controller/sequencer 780 may receive the output of pattern threshold detector 670 and the outputs of one or more of the other circuitry within the transmitter equalization partial response adaptation engine 770, and may process this input data to control an amplification level of the VGA 760.

The controller/sequencer 780 may receive input signals from a user interface and sequence controller 795. For example, the controller/sequencer 780 may receive a "freeze" signal (e.g., pma_tx_adapt_en) indicative of continuing operation of one or more components of the receiver 710 without changing current settings of the one or more components, and output a corresponding "freeze" signal (e.g., rx_adp_hold_en) to the one or more components of the receiver 710. The "freeze" signal may be used when accumulating samples of the data signal to determine whether there is any change in the ISI of the data signal due to changes implement by the transmitter equalization partial response adaptation engine 770. In particular, the "freeze" signal may ensure a controller environment without interference by changes in operation of the one or more components of the receiver 710 to accurately determine whether the ISI is reduced due to the changes implemented by the transmitter equalization partial response adaptation engine 770. The controller/sequencer 780 may receive a signal (e.g., pma_tx_accum) to accumulate data samples (e.g., of the received signal, of operational characteristics of the receiver 710, and the like). The controller/sequencer 780 may receive a signal (e.g., pma_adp_rstn) to reset the one or more components of the receiver 710 (e.g., to accumulate more data samples).

The data integrator 790 may operate as an averaging filter. In particular, the data integrator 790 may average (e.g., N=(N+the input to data integrator 790)/M) the output signal from the data accumulator 680. In particular, the data integrator 790 may serve as an averaging filter for the accumulated sign product. In addition, the data integrator 790 may average the filtered product of sign errors produced by the data accumulator 680. The data integrator 790 may output (as a signal) its result to the controller/sequencer 780 for further processing.

Moreover, the data integrator 790 may output one or more signals indicative of a transmitter adjustment to reduce the ISI in the high speed serial data signal caused by transmission in the communication channel 740 to the user interface and sequence controller 795. The transmitter 720 includes a finite impulse response (FIR) filter 800. The FIR filter 800 applies FIR coefficients to a data signal to be sent by the transmitter 720, such that a resulting impulse response settles to zero in finite time. Adjusting the FIR coefficients may adjust an amount of ISI in the high speed serial data signal sent by the transmitter 720.

In some embodiments, the high speed serial data signal may include a summation of multiple bits 820, 830, 840 overlapping one another. The multiple bits may include a current or main bit 830, a previous or precursor bit 820 that immediately precedes the main bit 830, and a following or postcursor bit 840 that immediately follows the main bit 830. In some embodiments, the main bit 830, the precursor bit 820, and the postcursor bit 840 may be sent in one or more training packets 850.

Weights of each bit may be set to reduce the ISI in the data signal received by the receiver 710 caused by transmission in the communication channel 740. In some circumstances (e.g., when the communication system 700 operates using the PCIe communication protocol), the weights of each of the main bit 830, the precursor bit 820, and the postcursor bit 840 are assumed to be equal. If the weights of the precursor bit 820 and/or the postcursor bit 840 are changed, circuitry or components of the transmitter 720 may compensate for the change by adjusting the weight of the main bit 830. For example, if the weight of the precursor bit 820 is decremented and the weight of the postcursor bit 840 does not change, then the weight of the main bit 830 is incremented. If the weight of the precursor bit 820 does not change and the weight of the postcursor bit 840 is incremented, then the weight of the main bit 830 is decremented. If both the weights of the precursor bit 820 and the postcursor bit 840 are incremented, the weight of the main bit 830 is decremented by two. If the weight of the precursor bit 820 is incremented and the weight of the postcursor bit 840 is decremented, then the weight of the main bit 830 does not change.

As such, the data integrator 790 may output the one or more signals indicative of the transmitter adjustment to reduce the ISI in the high speed serial data signal caused by transmission in the communication channel 740 by outputting one or more signals indicative of adjusting weights of the precursor bit 820 and/or the postcursor bit 840. In particular, the data integrator 790 may output one or more signals indicative of incrementing the precursor bit 820 (e.g., pma_tx_pre_up_tap), decrementing the precursor bit 820 (e.g., pma_tx_pre_dn_tap), incrementing the postcursor bit 840 (e.g., pma_tx_post_up_tap), and/or decrementing the postcursor bit 840 (e.g., pma_tx_post_dn_tap), to the user interface and sequence controller 795.

The receiver 710 includes the user interface and sequence controller 795 that may present an industry standard control interface. For example, the user interface and sequence controller 795 may be compliant with physical interface PCIe (PIPE). The user interface and sequence controller 795 may include a finite state machine that controls physical medium attachment (PMA) sequencing and provides timeout counters for handling converging measurements. The user interface and sequence controller 795 may sample appropriate PMA feedback to determine and/or send a signal (e.g., dirfeedback) indicative of an increment, decrement, and/or constant response for pre-cursor bit 820 and/or post-cursor bit 840 evaluations. The signal may be based at least in part on input signals provided by the data integrator 790. The user interface and sequence controller 795 may also send a signal (e.g., status) indicative of a "valid" status indication (e.g., to a user interface).

The user interface and sequence controller 795 may receive input signals from a media access control layer. For example, an input "freeze" signal (e.g., rxeqinprogress) indicates that the receiver 710 should continue operation of one or more components of the receiver 710 without changing the current settings of the one or more components. An input signal (e.g., rxeqeval) indicates that the receiver 710 should accumulate data samples (e.g., of the received signal, of operational characteristics of the receiver 710, and the like) and provide feedback. The user interface and sequence controller 795 may output one or more signals to the controller/sequencer 780 of the receiver 710, including a "freeze" signal (e.g., pma_tx_adapt_en) indicative of continuing operation of one or more components of the receiver 710 without changing current settings of the one or more components, a signal (e.g., pma_tx_accum) to accumulate data samples (e.g., of the received signal, of operational characteristics of the receiver 710, and the like), and a signal (e.g., pma_adp_rstn) to reset the one or more components of the receiver 710 (e.g., to accumulate more data samples).

The output signal (e.g., dirfeedback) of the user interface and sequence controller 795 that is indicative of an increment, decrement, and/or constant response for pre-cursor bit 820 and/or post-cursor bit 840 evaluations may be sent to a transmit buffer 821. The transmit buffer 821 may buffer a signal 841 based on the output signal of the user interface and sequence controller 795 to be transmitted by the receiver 710. The signal 841 sent by the receiver 710 may propagate through a backchannel 831 as provided by components associated with a communication-related standard or protocol, such as PCI Express (PCIe), Ethernet, and the like, and may be any medium used to communicate such signals. The signal 841 may be sent in the form of training packets 850.

The signal sent by the receiver 710 may be received at a receive buffer 851 of the transmitter 720, which may buffer the signal 841 and output the signal 841 or a signal based on the signal 841 sent by the receiver 710 to a transmission equalizer 810 of the FIR filter 800 of the transmitter 720. The transmission equalizer 810 may generate and/or adjust FIR coefficients, and the FIR filter 800 may apply the FIR coefficients to a data signal to be sent by the transmitter 720. Iteratively adjusting the FIR coefficients based on feedback received by the receiver 710 enables the communication system 700 to reduce the ISI caused by transmission of a high speed serial data signal in the communication channel 740.

Figure 9:
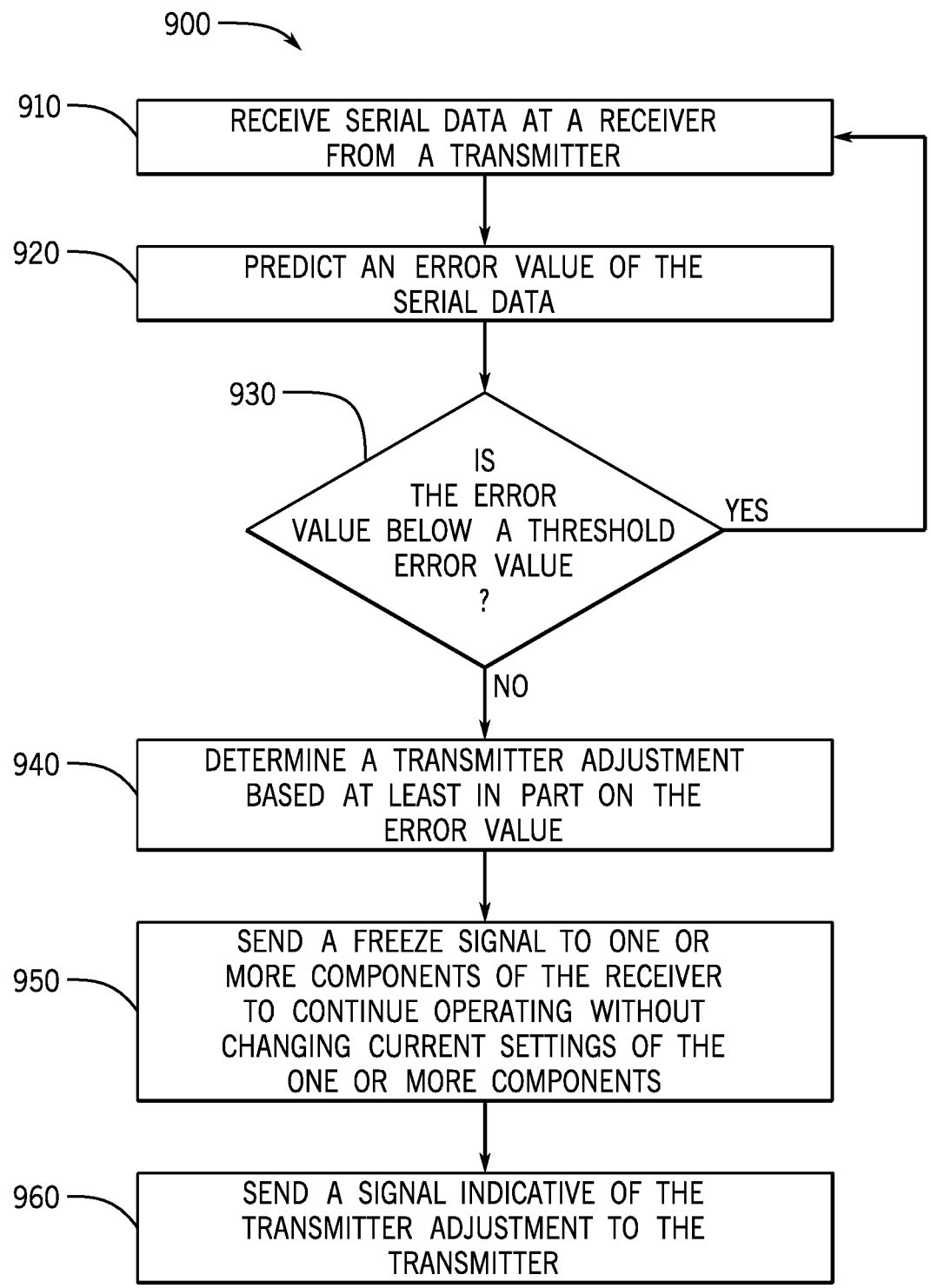
FIG. 9 is a flow diagram of a method for adjusting a transmitter based at least in part on a received high speed serial data signal from the transmitter, in accordance with an embodiment of the present disclosure.

FIG. 9 is a flow diagram of a method 900 for adjusting the transmitter 720 of the communication system 700 of FIG. 8 based at least in part on a received high speed serial data signal from the transmitter 720, in accordance with an embodiment of the present disclosure. As illustrated, the receiver 710 receives (block 910) serial data from the transmitter 720 (e.g., at the receive buffer 750). The receive buffer 750 may buffer the received data signal and output the data signal to the VGA 760. The VGA 760 may apply a gain to the received data signal by, for example, amplifying the received data signal by a certain magnitude, as described above. After a gain is applied to the received data signal by the VGA 760, the received data signal may be output to the summation node 620.

The partial response summation node 620 may use sense amplifiers (e.g., 410, 420) to "slice" or predict (block 920) error value representative of errors in the received serial data signal caused by ISI when transmitting over a communication channel (e.g., channel 740). Using the two sense amplifiers 410, 420 may trade physical limitations of the summation node 620 for an extended use of digital signal processing in the transmitter equalization partial response dLev Sign-Sign LMS adaptation engine 770. The partial response summation node 620 may use values $+\alpha$ and $-\alpha$, values +dLev and −dLev, and polarities of a and dLev, as inputs to multiplexers (e.g., 430, 440).

Based at least in part on the received data signal (e.g., via the DFE 625 and/or the adaptation deserializer 630), the transmitter equalization partial response adaptation engine 770 determines (node 930) if the predicted error value is below a threshold error value. For example, the data integrator 790 may operate as an averaging filter. That is, the data integrator 790 may average the filtered product of sign errors produced by the data accumulator 680 (e.g., via the data filter 645, the pattern detect accumulator 650, the pattern threshold detector 670, the controller/sequencer 780, and/or the product multiplier 660). The data integrator 790 may determine when the average of the filtered product (integration value) of sign errors produced by the data accumulator 680 reach pre-defined thresholds.

The transmitter equalization partial response adaptation engine 770 determines (block 940) a transmitter adjustment based at least in part on the predicted error value. As described above, the data integrator 790 may output signals (e.g., pma_tx_pre_up_tap, pma_tx_pre_dn_tap, pma_tx_post_up_tap, pma_tx_post_dn_tap) to control incrementing or decrementing precursor bits 820 and postcursor bits 840 at the transmitter 720 to the user interface and sequence controller 795.

The transmitter equalization partial response adaptation engine 770 sends a freeze signal (block 950) to one or more components of the receiver 710 to continue operating without changing current settings of the one or more components. In particular, the controller/sequencer 780 may send a "freeze" signal (e.g., rx_adp_hold_en) to the one or more components of the receiver 710. In this manner, the effect of the transmitter adjustment can be more accurately determined. The controller/sequencer 780 may send the "freeze" signal based on receiving a corresponding "freeze" signal (e.g., pma_tx_adapt_en) from the user interface and sequence controller 795, which in turn may receive a corresponding "freeze" signal (e.g., rxeqinprogress) from a media access control layer. The "freeze" signal may be used when accumulating samples of the data signal to determine whether there is any change in the ISI of the data signal due to changes implement by the transmitter equalization partial response adaptation engine 770. In particular, the "freeze" signal may ensure a controller environment without interference by changes in operation of the one or more components of the receiver 710 to accurately determine whether the ISI is reduced due to the changes implemented by the transmitter equalization partial response adaptation engine 770.

The receiver 710 may then send (block 960) a signal to the transmitter 720 indicative of the transmitter adjustment. For example, the user interface and sequence controller 795 may send a signal (e.g., dirfeedback) indicative of an increment, decrement, and/or constant response for pre-cursor bit 820 and/or post-cursor bit 840 evaluations. The signal may be based at least in part on input signals (e.g., pma_tx_pre_up_tap, pma_tx_pre_dn_tap, pma_tx_post_up_tap, pma_tx_post_dn_tap) provided by the data integrator 790. The signal may be sent via the backchannel 830 (e.g., as provided by components associated with a communication-related standard or protocol such as PCIe, Ethernet, and the like). The transmitter 720 may then adjust (via the transmitter equalizer 810 in the FIR filter 800) its settings based at least in part on the transmitter adjustment to reduce the ISI in a subsequent signal caused by a transmission medium (e.g., the communication channel 740). After sending the signal to the transmitter 720 indicative of the transmitter adjustment, the transmitter equalization partial response adaptation engine 770 may then send a signal to the one or more components of the receiver 710 to "unfreeze," such that the one or more components may resume operating before receiving the "freeze" signal.

Techniques for reducing inter-symbol-interference (ISI) in a high speed serial data signal by adjusting a transmitter sending the signal are disclosed. A transmitter equalization partial response adaptation engine of a receiver receiving the signal may determine a transmitter adjustment based at least in part on error in the signal. The transmitter adjustment may be sent to the transmitter by the receiver via a backchannel (e.g., as provided by components associated with a communication-related standard or protocol such as PCIe, Ethernet, and the like). The transmitter may then adjust its settings based at least in part on the transmitter adjustment to reduce the ISI in the signal.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. Circuitry comprising:
a first receiver configured to receive a data signal from a first transmitter, wherein the first receiver comprises summation node circuitry configured to predict an error value of the data signal;
a second transmitter configured to send a signal indicative of a transmitter adjustment to a second receiver coupled to the first transmitter, wherein the transmitter adjustment is configured to cause the first transmitter to adjust transmission of the data signal from the first transmitter to the first receiver; and adaptation engine circuitry, coupled to the summation node circuitry, wherein the adaptation engine circuitry is configured to:

determine the transmitter adjustment for the first transmitter based at least in part on the error value;

send a freeze signal to one or more components of the first receiver to cause the first receiver to continue operating without changing current settings of the one or more components;

accumulate samples of the data signal received from the first transmitter while the first receiver continues operating without changing current settings of the one or more components;

determine whether the transmitter adjustment reduces inter symbol interference in the samples of the data signal while the first receiver continues operating without changing current settings of the one or more components; and in response to determining that the transmitter adjustment reduces the inter symbol interference in the samples of the data signal, send an unfreeze signal to the one or more components of the first receiver to cause the first receiver to resume operating as before the freeze signal was sent.

2. The circuitry of claim 1, wherein the data signal comprises a main bit, a precursor bit, and a postcursor bit, wherein the transmitter adjustment comprises one or more signals indicative of incrementing or decrementing the precursor bit or incrementing or decrementing the postcursor bit.

3. The circuitry of claim 1, wherein the signal indicative of the transmitter adjustment is indicative of an increment, decrement, or constant response of a pre-cursor bit or a post-cursor bit.

4. The circuitry of claim 1, comprising a data slicing level Digital-to-Analog Convertor that is configured to predict a data slicing level value associated with the data signal.

5. The circuitry of claim 4, wherein the summation node circuitry is coupled to the data slicing level Digital-to-Analog Convertor, wherein the summation node circuitry is configured to predict the error value based at least in part on the predicted data slicing level.

6. A method for reducing inter-symbol-interference, comprising:

receiving a data signal at a receiver from a transmitter;
predicting an error value of the data signal;
determining a transmitter adjustment for the transmitter based at least in part on the error value;
sending a freeze signal to one or more components of the receiver to cause the receiver to continue operating without changing current settings of the one or more components;
sending a signal indicative of the transmitter adjustment to the transmitter;
accumulating samples of the data signal received from the transmitter while the receiver continues operating without changing current settings of the one or more components;
determining whether the transmitter adjustment reduces inter symbol interference in the samples of the data signal while the receiver continues operating without changing current settings of the one or more components; and
in response to determining that the transmitter adjustment reduces the inter symbol interference in the samples of the data signal, sending an unfreeze signal to the one or more components of the receiver to cause the receiver to resume operating as before the freeze signal was sent.

7. The method of claim 6, wherein the data signal comprises a main bit, a precursor bit, and a postcursor bit, wherein the transmitter adjustment comprises one or more signals indicative of incrementing or decrementing the precursor bit or incrementing or decrementing the postcursor bit.

8. The method of claim 6, wherein the signal indicative of the transmitter adjustment is indicative of an increment, decrement, or constant response of a pre-cursor bit or a post-cursor bit.

9. The method of claim 6, comprising determining whether the error value is below a threshold error value.

10. The method of claim 9, wherein determining whether the error value is below the threshold error value comprises:

computing a bitwise product of sign errors associated with the data signal for use in a Sign-Sign Least Mean Squares technique computation;

filtering the bitwise product of sign errors;

averaging the filtered bitwise product of sign errors; and comparing the averaged filtered bitwise product of sign errors to a pre-defined threshold value.

11. A communication system for processing a data signal, comprising:

a first transmitter configured to send the data signal to a receiver via a communication channel;

circuitry comprising:

the receiver configured to receive the data signal via the communication channel, and wherein the receiver comprises:

summation node circuitry that is configured to predict an error value of the data signal;

adaptation engine circuitry, coupled to the summation node circuitry, wherein the adaptation engine circuitry is configured to:

determine a transmitter adjustment for the first transmitter based at least in part on the error value;

send a freeze signal to one or more components of the receiver to cause the receiver to continue operating without changing current settings of the one or more components;

accumulate samples of the data signal received from the first transmitter while the receiver continues operating without changing current settings of the one or more components;

determine whether the transmitter adjustment reduces inter symbol interference in the samples of the data signal while the receiver continues operating without changing current settings of the one or more components; and in response to determining that the transmitter adjustment reduces the inter symbol interference in the samples of the data signal, send an unfreeze signal to the one or more components of the receiver to cause the receiver to resume operating as before the freeze signal was sent; and a second transmitter, coupled to the adaptation engine circuitry, wherein the second transmitter is configured to send a signal indicative of the transmitter adjustment to the first transmitter via a backchannel;
the communication channel; and
the backchannel.

12. The communication system of claim 11, wherein the communication system comprises a programmable logic device, wherein the programmable logic device comprises the receiver.

13. The communication system of claim 11, wherein the communication system comprises a programmable logic device, wherein the programmable logic device comprises the first transmitter.

14. The communication system of claim 11, wherein the first transmitter comprises a finite impulse response filter configured to apply finite impulse response coefficients to a second data signal to be sent by the first transmitter.

15. The communication system of claim 14, wherein the finite impulse response filter comprises a transmission equalizer, wherein the transmission equalizer is configured to generate or adjust the finite impulse response coefficients based at least in part on the signal indicative of the transmitter adjustment.

16. The communication system of claim 15, wherein the finite impulse response coefficients are configured to be applied such that a precursor bit of the second data signal is incremented or decremented based at least in part on the signal indicative of the transmitter adjustment, or a postcursor bit of the second data signal is incremented or decremented based at least in part on the signal indicative of the transmitter adjustment.

17. The communication system of claim 16, wherein the finite impulse response coefficients are configured to be applied such that a main bit of the second data signal compensates for the incremented or decremented precursor bit or the incremented or decremented postcursor bit.

18. The communication system of claim 17, wherein the first transmitter is configured to send the second data signal to the receiver via the communication channel.

19. The communication system of claim 11, wherein the backchannel is provided by components associated with a communication-related standard or protocol.

20. The communication system of claim 19, wherein the communication-related standard or protocol is PCI Express or Ethernet.

* * * * *